Feb. 7, 1961     H. E. SCHULTZ     2,971,126
TRANSISTOR INVERTER CIRCUITS

Filed Dec. 29, 1958     2 Sheets-Sheet 1

INVENTOR.
Harry E. Schultz
BY
His Attorney

United States Patent Office 2,971,126
Patented Feb. 7, 1961

2,971,126

TRANSISTOR INVERTER CIRCUITS

Harry E. Schultz, Euclid, Ohio, assignor to General Electric Company, a corporation of New York Filed Dec. 29, 1958, Ser. No. 783,337

8 Claims. (Cl. 315—205)

This invention relates to transistor inverters using semiconductor devices or transistors for obtaining an alternating current output from a direct current supply and is more particularly concerned with such circuits for operating discharge lamps.

Transistor inverters provide a convenient means for obtaining alternating current from a direct current supply and are finding increasing use on account of their high efficiency. One well known inversion circuit, sometimes referred to as a ferroresonant transistor oscillator, utilizes a saturating transformer having a core with a rectangular hysteresis characteristic as the frequency determining element. The D.C. supply voltage or battery is switched with alternating polarity across the primary winding of a saturable transformer by the transistors. This produces a substantially rectangular wave pattern whose half-cycle period is proportional to the time required for the transformer core to become magnetically saturated after each reversal of the conducting conditions of the transistors. The time required is inversely proportional to the magnitude of the D.C. supply or battery source voltage. Consequently the frequency of the alternating voltage output is directly proportional to the battery voltage and for some applications this is a disadvantageous characteristic. For instance in a high frequency discharge lamp operating circuit where a reactive ballast is used to limit the discharge current through a fluorescent lamp load, a change in output frequency will cause a change in lamp current.

Accordingly the objects of the invention are to provide improved transistorized power inverters for producing an alternating current output from a direct current supply and which are characterized by their frequency stability independently of the magnitude of the direct current supply voltage.

A more specific object of the invention is to provide a transistorized inversion circuit for operating electric discharge lamps wherein the operating frequency varies with the lamp load to give minimum loss dissipation in the transistors.

Other objects and advantages of the present invention will become apparent from the following description thereof as developed in connection with the detailed description of embodiments illustrating its principles. The features of the invention believed to be novel will be more particularly pointed out in the appended claims.

Figure 1:
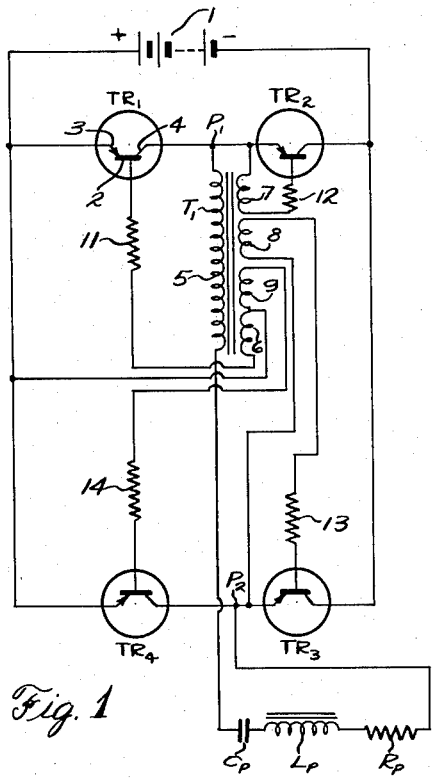
Fig. 1 is a schematic circuit diagram of a transistor inverter circuit in accordance with the present invention utilizing four transistors for switching the D.C. supply.

In accordance with the invention, the load circuit of the inverter combines inductance and capacitance with the load proper to present an impedance which is substantially purely resistive at the selected operating frequency. A current transformer is connected in series with the load to feed back current bias to the transistors in order to maintain the oscillations in the inverter at the natural resonant frequency of the load circuit.

In a preferred embodiment for operating a multiple lamp load, an auxiliary feedback means is provided to initiate and sustain oscillations until the lamps are ionized and draw current, after which the current feedback transformer overrides the auxiliary feedback means and controls the operating frequency.

In the inverter circuits illustrated in the drawings wherein like reference numbers designate corresponding elements in the several figures, the direct current supply or source is represented as a battery 1. Of course any other source of direct current may likewise be used, including for instance a rectifier operating from the usual 115–120 volt, 60 cycle alternating current supply.

The semiconductive switching devices or power transistors designated generally TR in the drawings may suitably be of the junction type wherein a body of semiconductive material such as silicon or germanium is provided with three distinct regions by means of controlled impurities to establish rectifying junctions between regions of opposite conductivity types. Suitable contacts are made to the terminal regions to provide the emitter and collector electrodes and a low-resistance contact is made to the semiconducting body to provide the base electrode. By applying a forward bias to the emitter base junction (making the base electrode negative with respect to the emitter electrode in the case of a p-n-p transistor), a saturated condition of the transistor occurs wherein the resistance between emitter and collector electrodes becomes relatively small. By applying a reverse or back bias between emitter and base electrodes, the transistor is cut off and the resistance between emitter and collector electrodes becomes relatively very large.

The transistors $TR_1$, $TR_2$, $TR_3$, and $TR_4$ are of the p-n-p junction type. As shown for $TR_1$ in Fig. 1, the symbolic representation indicates the base electrode at 2, the emitter electrode at 3, and the collector electrode at 4. The primary function of the transistors is to alternately switch the direct current supply or source 1 across opposite sides of a load connected between output points $P_1$ and $P_2$ formed by the junctions of the transistor pairs $TR_1$, $TR_2$ and $TR_3$, $TR_4$. The emitter-collector electrode paths of the transistors in each pair are connected in series across the source 1. A control circuit comprising current transformer $T_1$, capacitor $C_p$, inductor $L_p$ and the load $R_p$ controls the conducting states of the transistors to alternately turn on transistors $TR_1$ and $TR_3$ while transistors $TR_2$ and $TR_4$ are turned off, and then to turn on transistors $TR_2$ and $TR_4$ while transistors $TR_1$ and $TR_3$ are turned off. When transistor $TR_1$ is turned on, output terminal $P_1$ is connected through a low resistance emitter-collector electrode path to the positive side of the battery; simultaneously output terminal $P_2$ is connected through the low-resistance emitter-collector path of transistor $TR_3$ to the negative side of the battery. At such time the emitter-collector paths of transistors $TR_2$ and $TR_4$ have high resistance and are substantially non-conducting. When the conductivity states of the transistors are reversed, terminal $P_1$ becomes effectively connected to the negative side of the battery and terminal $P_2$ to the positive side. Thus a rectangular alternating waveform of voltage is produced across output terminals $P_1$, $P_2$. The alternating voltage level available at the output terminals may be raised or lowered in conventional fashion through a transformer or autotransformer interposed before the load.

The manner of determining the frequency of the rectangular wavepattern output voltage in accordance with the invention will now be explained. Transformer $T_1$ is a current transformer such that the current flowing through the primary winding governs the currents flowing through the secondary windings. The primary winding 5 of the transformer is connected in series with capacitor $C_p$, inductor $L_p$ and load $R_p$ across output terminals $P_1$ and $P_2$. The secondary windings 6 to 9 of the transformer are connected in series with current regulating resistors 11 to 14 between the emitter and base electrodes of transistors $TR_1$ to $TR_4$ respectively. Secondary windings 6 to 9 are tightly coupled to the primary winding 5 and transformer $T_1$ may be substantially without leakage reactance and reflects only a relatively small equivalent series resistance into the load circuit. However if the transformer does reflect some inductances into the load circuit, such reflected inductance becomes part of the total inductance in the load circuit.

Capacitor $C_p$ and inductor $L_p$ in series with load $R_p$ are proportioned to be series resonant at the desired frequency of operation of the inverter. If the actual load contains included inductance or capacitance, then $L_p$ or $C_p$ are varied to compensate. The natural frequency of oscillation of the load circuit is given by the relationship:

$$2\pi f = \sqrt{\frac{1}{LC} - \frac{R^2}{4L^2}}$$

where $f$=the natural resonant frequency of the circuit,
$L$=total inductance in the circuit,
$C$=total capacitance in the circuit,
$R$=total resistance in the circuit.

Provided $$\frac{1}{LC} \text{ is greater than } \frac{R^2}{4L^2}$$

the circuit will be oscillatory, as desired in accordance with the invention. Under these conditions, the load circuit is shock-excited into oscillation at each switching action of the transistors and draws a substantially sinusoidal current whereupon it causes the next switching action of the transistors at a time interval one-half cycle later according to its natural resonant frequency.

The switching of the transistors is controlled through the base currents supplied by secondary windings 6 to 9 transformer $T_1$. During the half cycle of load current corresponding to conduction through transistors $TR_1$ and $TR_3$, secondary windings 6 and 8 draw current from the base electrodes, that is they hold the base electrodes negative relative to the emitter electrodes. At the end of the first half-cycle, the currents supplied by secondary windings 6 and 8 are reversed, that is the bias supplied to the base electrodes of transistors $TR_1$ and $TR_3$ changes from negative to positive relative to the emitter electrodes, and cause transistors $TR_1$ and $TR_3$ to be turned off. The currents supplied by secondary windings 7 and 9 are likewise reversed and cause transistors $TR_2$ and $TR_4$ to be turned on to start another half cycle. At the end of each half cycle, a reversal occurs so that the load circuit is supplied with alternating voltage at its natural resonant frequency. Thus the operating frequency is substantially independent of the supply voltage.

Figure 2:
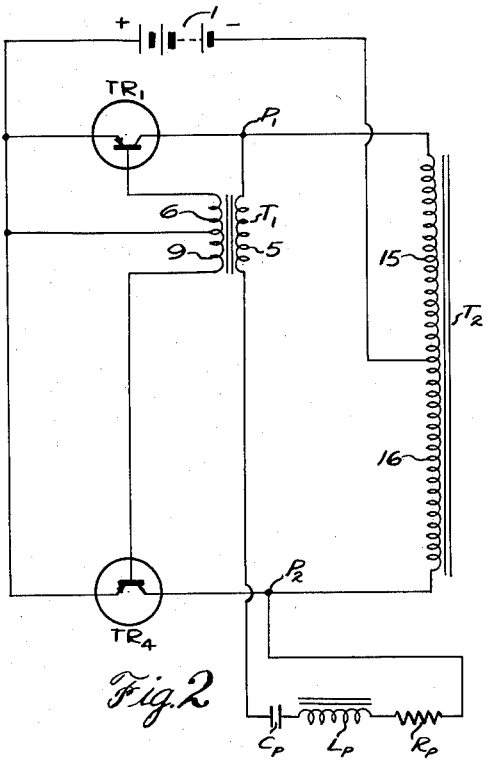
Fig. 2 is a variant using a center-tapped transformer and two transistors for switching.

The circuit of Fig. 2 represents a variant wherein only 2 transistors $TR_1$ and $TR_4$ are used and wherein the negative side of battery 1 is connected to the center tap of an autotransformer $T_2$ connected across output terminals $P_1$, $P_2$. With this arrangement, the operation of the transistors cause the supply voltage to be alternately switched across the halves 15 and 16 of autotransformer $T_2$ so that an alternating voltage of rectangular waveform and of twice the amplitude of the D.C. supply voltage is developed across output terminals $P_1$, $P_2$. The resonant operation of the load circuit is of course the same as has been previously described with reference to Fig. 1 and determines the output frequency of the inverter circuit substantially independently of the supply voltage. It will be appreciated that in the circuit of Fig. 2 the inverse voltage across the transistors is double the direct current supply or battery voltage, so that for the same supply voltage and load conditions it is necessary to use transistors of double the forward hold-off voltage capacity of those of Fig. 1.

Figure 3:
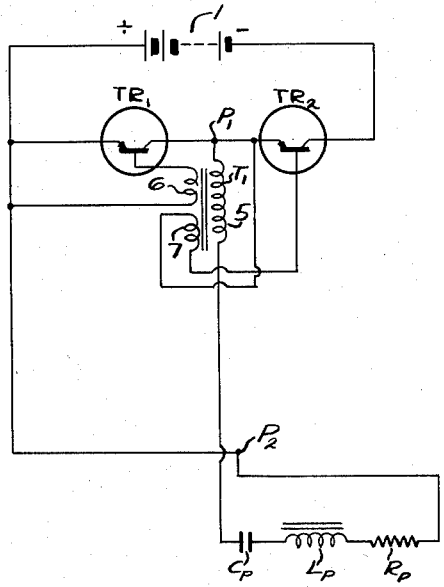
Fig. 3 is another variant using two transistors only and a D.C. blocking capacitor for switching.

In the variant of Fig. 3, the one side of the battery, the positive side in the illustrated embodiment, is directly connected to output terminal $P_2$ and transistors $TR_1$ and $TR_2$ alternately switch output terminal $P_1$ from the negative to the positive side of the battery. Thus the voltage applied across output terminals $P_1$, $P_2$ may be viewed as a series of unidirectional pulses of maximum amplitude substantially equal to the battery or direct current supply voltage. However since cepacitor $C_p$ blocks direct current flow, it charges up to an average value equal to half the battery voltage and the load $R_p$ thus effectively receives only the alternating current component of voltage. The load circuit comprising capacitance $C_p$, inductance $L_p$ and load resistance $R_p$ is proportioned to be series resoant at the desired frequency. Thus the load circuit draws a substantially sinusoidal current through primary winding 5 of current transformer $T_1$ whose secondary windings 6 and 7 supply the bias current to transistors $TR_1$ and $TR_2$ respectively. The bias currents to the base electrodes of the transistors alternately turn them on and off in similar fashion as described earlier with reference to the circuit of Fig. 1.

Figure 4:
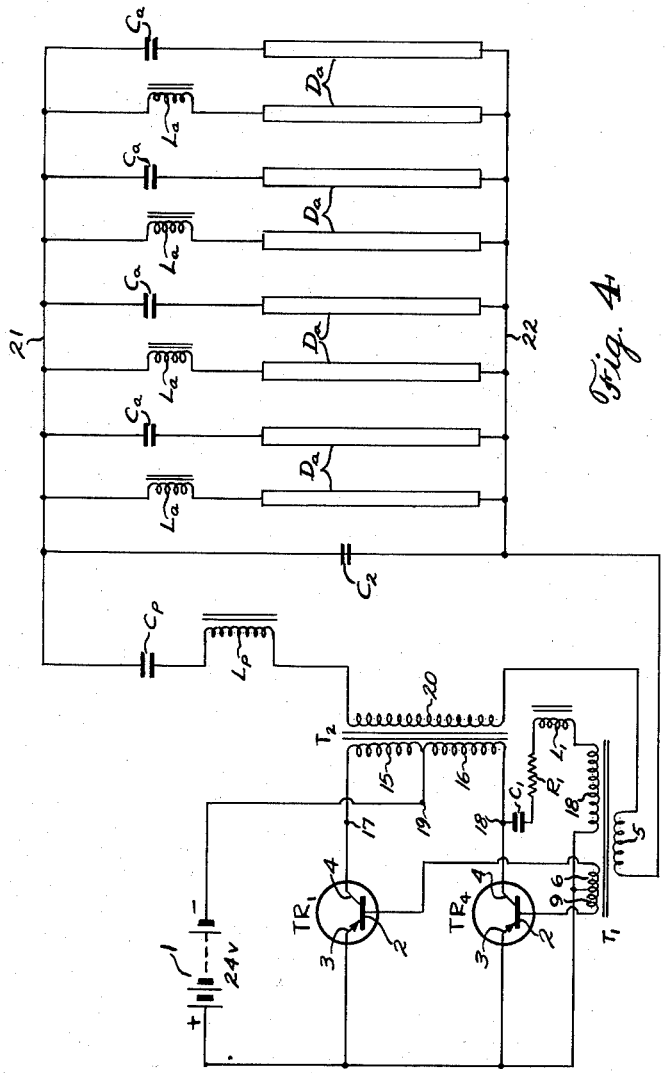
Fig. 4 is a schematic circuit diagram of a transistor inverter circuit for operating a multiple lamp load and constituting a preferred embodiment of the invention.

The inverter circuit combination of Fig. 4 illustrates a preferred embodiment of the invention for the operation of a plurality of electric discharge lamps in multiple. The inverter circuit proper follows in general the configuration illustrated in Fig. 2. It comprises a pair of transistors $TR_1$ and $TR_4$ whose emitter electrodes 3 are connected in common to the positive side of a direct current source 1 which may conveniently be a 24-volt battery. The collector electrodes 4 of the transistors are connected to opposite sides of the primary winding sections 15, 16 of output transformer $T_2$ at 17, 18. The negative side of the battery is connected to the common junction point 19 of the sections, that is the center tap of the primary winding.

Instead of coupling the load circuit across points 17, 18 in parallel with the primary winding of transformers $T_2$ as in the embodiment of Fig. 2, it is coupled into the inverter circuit by means of a secondary winding 20 on output transformer $T_2$. The load proper consists of a plurality of electric discharge lamps $D_a$, eight being shown in the drawing. These lamps may conveniently be slimline fluorescent lamps commercially designated 42T–6 of 42 inches nominal length with a rating of 25 watts, 145 volts at 200 milliamperes. The lamps of course have a negative resistance characteristic making it necessary to limit the discharge current. As shown, alternate lamps are ballasted by inductors $L_a$ and capacitors $C_a$, the lamps with their individual ballasts being connected in multiple or parallel across line conductors 21, 22. The inductive ballasts $L_a$ and capacitive ballasts $C_a$ present substantially equal reactances of opposite kind at the operating frequency of the system so that the overall load across line conductors 21, 22 draws substantially unity power factor current when all the lamps are operating. Of course if the inductively and capacitively ballasted lamps are not equal in number the load circuit proper will no longer draw unity power factor current. Thus for instance if one of the capacitively ballasted lamps is defective or for some reason fails to ignite, the lamp load will draw lagging power factor current if the frequency remains unchanged, that is it will exhibit a net inductive reactance component.

The lamp load proper, that is the lamps and their resepctive ballasts connected in parallel across conductors 21, 22, is connected in series with capacitance $C_p$, and inductance $L_p$ to form the load circuit connected in series with primary winding 5 of current transformer $T_1$ across secondary winding 20 of output transformer $T_2$. The load circuit is series resonant at the selected frequency of operation of the system. Capacitor $C_2$ in parallel with the lamp load is of relatively small size for the purpose of bypassing radio frequency energy or noise and preventing it from feeding back through the circuit into the transistor power supply. Secondary windings 6 and 9 of transformer $T_1$ are connected between the base and emitter electrodes of transistors $TR_1$ and $TR_4$, respectively. In the operation of current transformer $T_1$, when the lamps $D_a$ are ignited and drawing current, the load current through primary winding 5 induces corresponding currents in secondary windings 6, 9 which alternately turn on and off transistors $TR_1$ and $TR_4$.

The lamps $D_a$ present an open circuit prior to ignition when power is first applied to the inverter circuit. Therefore the load current feedback circuit is not at first effective unless by happenstance one or more lamps should start on the transient voltage that occurs when power is first applied. According to a feature of the instant invention, this starting problem is elminated by providing an auxiliary driving circuit comprising capacitor $C_1$, resistor $R_1$, inductor $L_1$, and an auxiliary winding 18 on transformer $T_1$ all connected in series between the emitter and collector electrodes of one of the transistors, namely transistor $TR_4$ in the illustration. Capacitor $C_1$ and inductor $L_1$ are proportioned to achieve series resonance in the auxiliary driving circuit at the selected operating frequency. The auxiliary circuit operates on the same general principle as the load current feedback circuit except that the load in this case consists of the emitter-base impedances of the transistors reflected into the circuit through the current transformer windings 6, 9 and 18. The auxiliary circuit parameters are proportioned to feed back only sufficient current to the transistor bases to sustain oscillations until the lamps ionize. Thereafter the load current through the lamps builds up sufficiently to take over the operation of the circuit and the feedback of bias current to the transistor bases. To accomplish this, the winding of inductance $L_1$ is made of small high resistance wire or alternatively the auxiliary circuit is padded with a series resistor $R_1$ as shown so that its effect on the circuit after the lamps have ignited is negligible. In other words, after ignition of the lamps, the load current drawn through winding 5 of current transformer $T_1$ overrides the signal coupled into the transformer by the auxiliary circuit through winding 18 and controls the operation of the transistor inverter circuit in accordance with the requirements of the lamp load.

While the auxiliary driving circuit has been illustrated in conjunction with the circuit of Fig. 4 only, it may be used with any of the circuits in accordance with the invention and is desirable wherever the load circuit cannot draw current immediately. This is particularly the case where the load proper comprises discharge lamps which must be ionized or ignited at starting.

A highly advantageous characteristic of the circuits in accordance with the invention is that the frequency of operation is determined automatically to give minimum dissipation in the transistors. Power transistors can handle very large cuurents provided the losses in them are kept low and this must be achieved by turning the transistors fully on when they are passing current and at other times fully off, and by insuring that the transition from conducting to nonconducting state occurs at a time when the current is substantially zero. In other words, the circuit must be designed so that the transistors are not interrupting current during the switching interval because to do so severely limits their power handling capacity.

The manner in which the desired condition of zero current at the instant of transistor switching is automatically achieved may be understood as follows, reference being made to the circuit of Fig. 4. Assuming a defective lamp which fails to ignite, the lamp load proper then introduces a reactive component into the circuit due to the unbalance in lag lamps as against lead lamps. However due to the overriding load current feedback through winding 5 of current transformer $T_1$, the frequency of the inverter circuit shifts so that the reactance of the wave-shaping circuit comprising capacitor $C_p$ and inductor $L_p$ compensates for the load change. Thus for instance if a capacitively ballasted lamp should fail to ignite, the lamp load will thereupon present a net inductive reactance component at the original frequency of operation. The load current feedback control then causes the frequency of operation to decrease slightly so that the total current drawn by the load circuit shifts towards unity and series resonance is maintained throughout the overall secondary circuit. If an inductively ballasted lamp is lost to the circuit, the frequency shift occurs in the opposite direction, that is the frequency of operation increases.

In a combination according to Fig. 4 actually constructed and tested and operating 8 42T-6 lamps for a total load of 200 watts at 1700 cycles from a 24-volt battery supply, the following circuit constants were used and they are listed herein by way of example and not in order to limit the invention thereto:

| | |
|---|---|
| Transistors, $TR_1$, $TR_4$ | Type 2N 174 (Delco). |
| Transformer, $T_1$: | |
|    Primary 5 | 66 turns of No. 25 wire. |
|    Secondary 6, 9 | 44 turns of No. 20 wire, center-tapped. |
|    Auxiliary 18 | 240 turns of No. 34 wire. |
| Transformer T: | |
|    Primary 15, 16 | 80 turns of No. 18 wire, center tapped. |
|    Secondary 20 | 450 turns of No. 25 wire. |
| Inductor $L_1$ | 80 millihenries. |
| Inductor $L_p$ | 66 millihenries. |
| Inductor (ballast) $L_a$ | 200 millihenries. |
| Capacitor $C_1$ | .02 microfarad. |
| Capacitor $C_p$ | 0.5 microfarad. |
| Capacitor $C_2$ | .001 microfarad. |
| Capacitor (ballast) $C_a$ | .04 microfarad. |
| Resistor $R_1$ | 500 ohms. |
| Battery 1 | 24 volts. |

It will be understood that the various specific circuits which have been described herein are intended as exemplary and not as limitative of the invention. Likewise whereas the invention has been described using p-n-p type transistors, n-p-n type transistors may equally well be used with appropriate modification of the source potential with respect to the other circuit elements. The appended claims are therefore intended to cover any such modifications coming within the true spirit and scope of the invention.

What I claim as new and desire to secure by Letters Patent of the United States is:

1. An inverter circuit comprising a direct current source, a pair of transistors each having base, emitter and collector electrodes, a load circuit comprising a resistive load proper and inductance and capacitance combined therewith rendering said load circuit series resonant at a selected frequency of operation, connections from said source through the emitter-collector electrode paths of said transistors to said load circuit for energizing said load circuit in alternating polarity from said source, and a current transformer comprising a primary winding connected in series with said load circuit and secondary windings supplying emitter-base current to said transistors for alternately switching on said transistors at said selected frequency.

2. An inverter circuit comprising a direct current source, two pairs of transistors each having base, emitter and collector electrodes, each pair of transistors having their emitter-collector electrode paths connected in series across said source, the junctures of the transistors in each pair forming alternating current output terminals, a load circuit connected across said output terminals comprising a resistive load proper and inductance and capacitance combined therewith rendering said load circuit series resonant at a selected frequency of operation, a current transformer having a primary winding connected in series with said load circuit and secondary windings supplying emitter-base current to said transistors for alternately switching on one transistor in each pair to apply the source voltage across said output terminals in alternating polarity at said selected frenquency.

3. An inverter circuit comprising a direct current source, a pair of transistors each having base, emitter and collector electrodes, a pair of output terminals, connections from one side of said source through the emitter-collector electrode paths of said transistors to said output terminals, a center tapped transformer winding connected across said output terminals and having its center tap connected to the other side of said source, a load circuit comprising a resistive load proper and inductance and capacitance combined therewith rendering said load circuit series resonant at a selected frequency of operation, means coupling said load circuit across said output terminals, and a current transformer having a primary winding connected in series with said load circuit and secondary windings supplying emitter-base current to said transistors for switching on said transistors to apply the source voltage between said center tap and each output terminal alternately.

4. An inverter circuit comprising a direct current source, a pair of transistors each having base, emitter and collector electrodes, the emitter collector-electrode paths of said transistors being connected in series across said source, a load circuit comprising a resistive load proper and inductance and a series capacitance combined therewith rendering said load circuit series resonant at a selected frequency of operation, said load circuit being connected between the juncture of said transistors and one side of said source and said capacitance serving to block direct current flow through said load circuit, and a current transformer having a primary winding connected in series with said load circuit and having a pair of secondary windings supplying emitter-base current to said transistors for alternately switching on said transistors to develop an alternating voltage component in said load circuit.

5. An inverter circuit comprising a direct current source, a pair of transistors each having base, emitter and collector electrodes, a load circuit comprising a resistive load proper and inductance and capacitance combined therewith rendering said load circuit series resonant at a selected frequency of operation, connections from said source through the emitter-collector electrode paths of said transistors to said load circuit for energizing said load circuit in alternating polarity from said source, a current transformer comprising a primary winding connected in series with said load circuit and secondary windings supplying emitter-base current to said transistors for alternately switching on said transistors at said selected frequency, an auxiliary winding in said current transformer connected in series with an auxiliary inductance-capacitance circuit series resonant at approximately said selected frequency, between the emitter and collector electrodes of one of said transistors for starting and sustaining oscillations in said transistors prior to current flow through said load circuit.

6. A transistorized lamp operating circuit comprising a direct current source, a pair of transistors each having base, emitter and collector electrodes, an output transformer having a center tapped primary winding and a secondary winding, connections from one side of said source through the emitter-collector electrode path of said transistors to opposite sides of said primary winding, a connection from the center tap of said primary winding, to the other side of said source, a load circuit connected across said secondary winding and comprising a resistive load proper including a discharge lamp and an inductance and a capacitance connected in series therewith and rendering said load circuit series resonant at a selected frequency of operation, a current transformer having a primary winding connected in series with said load circuit across the secondary winding of said output transformer and having secondary windings supplying emitter-base current to said transistors for alternately switching on said transistors at said selected frequency, an auxiliary winding in said current transformer, said auxiliary winding being connected, in series with an auxiliary inductance-capacitance circuit series resonant at approximately said selected frequency, between the emitter and collector electrodes of one of said transistors for sustaining oscillations in said transistors prior to ignition of said lamps.

7. A transistorized lamp operating circuit comprising a direct current source, a pair of transistors each having base, emitter and collector electrodes, an output transformer having a center tapped primary winding and a secondary winding, connections from one side of said source through the emitter-collector electrode path of said transistors to opposite sides of said primary winding, a connection from the center tap of said primary winding, to the other side of said source, a load circuit connected across said secondary winding, said load circuit comprising a multiple grouping of discharge lamps alternately inductively and capacitively ballasted and an inductance and a capacitance connected in series with said multiple grouping rendering said load circuit series resonant at a selected frequency of operation, a current transformer having a primary winding connected in series with said load circuit across the secondary winding of said output transformer and having secondary windings supplying emitter-base current to said transistors for alternately switching on said transistors at said selected frequency, an auxiliary winding in said current transformer, said auxiliary winding being connected, in series with an auxiliary inductance-capacitance circuit series resonant at approximately said selected frequency, between the emitter and collector electrodes of one of said transistors for starting and sustaining oscillations in said transistors prior to ignition of said lamps.

8. An inverter circuit comprising a direct current source, a pair of transistors each having base, emitter, and collector electrodes, a load circuit comprising a resistive load proper and an inductance and a capacitance combined therewith rendering said load circuit series resonant at a selected frequency of operation, circuit connections from said source through the emitter-collector electrode paths of said transistors to said load circuit for energizing said load circuit in alternating polarity from said direct current source, and a current transformer comprising a primary winding connected in series circuit with said load circuit and having secondary windings supplying emitter-base current to said transistors for alternately switching on one of said transistors and switching off the other of said transistors when the instantaneous current through said load circuit is substantially at zero.

References Cited in the file of this patent

UNITED STATES PATENTS

| | | |
|---|---|---|
| 2,748,274 | Pearlman | May 29, 1956 |
| 2,774,878 | Jensen | Dec. 18, 1956 |
| 2,783,384 | Bright et al. | Feb. 26, 1957 |
| 2,798,160 | Bruck et al. | July 2, 1957 |
| 2,842,715 | Charbenneaux | July 8, 1958 |
| 2,872,623 | Bird | Feb. 3, 1959 |

FOREIGN PATENTS

| | | |
|---|---|---|
| 1,123,405 | France | June 11, 1956 |